United States Patent [19]
Redpath

[11] Patent Number: 5,854,629
[45] Date of Patent: Dec. 29, 1998

[54] ENHANCED SCROLLING TECHNIQUE FOR CONTEXT MENUS IN GRAPHICAL USER INTERFACES

[75] Inventor: Richard J. Redpath, Cary, N.C.

[73] Assignee: International Business Machine Corporation, Armonk, N.Y.

[21] Appl. No.: 774,560

[22] Filed: Dec. 31, 1996

[51] Int. Cl.⁶ ........................................................ G06F 3/00
[52] U.S. Cl. ........................... 345/341; 345/123; 345/343; 345/973
[58] Field of Search .................................... 345/123, 341, 345/343, 973

[56] References Cited

U.S. PATENT DOCUMENTS

| | | | |
|---|---|---|---|
| 5,485,174 | 1/1996 | Henshaw et al. | 345/123 |
| 5,553,225 | 9/1996 | Perry | 345/341 |
| 5,644,334 | 7/1997 | Jones et al. | 345/419 |
| 5,704,050 | 12/1997 | Redpath | 345/339 |
| 5,721,852 | 2/1998 | Porter | 345/349 |

OTHER PUBLICATIONS

The ABCs of Microsoft Office for Window 95 by Guy Hart–Davis, Copy right 1996, ISBN: 0–7821–1866–6.

*Primary Examiner*—Raymond J. Bayerl
*Assistant Examiner*—Cuong T. Thai
*Attorney, Agent, or Firm*—Gregory M. Doudnikoff

[57] ABSTRACT

A technique is provided for permitting only a predetermined number of panes of a context menu to be displayed and the scrolling of the context menu for undisplayed panes. Before a context menu is displayed in a graphical user interface, it is determined whether the total number of panes or options in the context menu exceeds the number of panes or options to be displayed at one time. If so, upon displaying the context menu, a selectable mechanism is displayed along the bottom edge of the context menu. User selection of the selectable mechanism causes the context menu to scroll up to display previously undisplayed panes or options. When it is determined that panes logically exist above the top most displayed pane, a selectable mechanism is displayed along the top edge of the context menu, such that user selection of the top mechanism causes the scrolling of the panes down. Alternatively, top and bottom scrolling mechanisms may permanently be displayed along the top and bottom edges of the context menu, with the mechanisms being non-selectable when no panes logically exist above or below the respective mechanisms.

13 Claims, 7 Drawing Sheets

FIG. 6  FIG. 7

ENHANCED SCROLLING TECHNIQUE FOR CONTEXT MENUS IN GRAPHICAL USER INTERFACES

BACKGROUND OF THE INVENTION

1. Field of the Invention

The present invention relates to a technique for providing an enhanced scrolling mechanism for elements in a graphical user interface (GUI). More particularly, the present invention provides a scrolling mechanism for context menus which saves real estate space within a graphical user interface which is a less visually intrusive indicator for indicating that undisplayed material exists and can be used in software applications for which pointer grab is not available.

2. Description of the Related Art

Graphical user interfaces were created in order to simplify interaction with computer programs for end users of computer programs. Graphical user interfaces are designed such that end users do not need to know specific commands, combinations of keystrokes, etc, in order to efficiently and effectively use the computer program. By selecting or clicking with a mouse a particular selection available in a graphical user interface, a function is carried out by the computer application which owns the graphical user interface.

Graphical user interfaces often attempt to project as much information as possible to a user. However, space is quite limited because of the size of a display device which an end user utilizes, such as a monitor, and/or by the size of an element within the graphical user interface in which information is displayed to the end user. Accordingly, techniques have been developed in order to convey to the end user that additional information logically exists beyond the edges of a window or other elements of the graphical user interface being displayed at any given time. One such technique provides a visual device known as a scroll bar. The scroll bar permits the user to navigate beyond the edges of an element. FIG. 1 illustrates a graphical user interface 40 including a window 42 which utilizes a vertical scroll bar 44 and a horizontal scroll bar 46. The vertical scroll bar 44 includes an up arrow 48, a down arrow 50 and a vertical bar 52. These indicate to the user not only that additional information logically exists above and below the top and bottom edges of the window 42, but the relative position of the information presently displayed in the window 42 relative to the undisplayed information, and provide a mechanism to view the undisplayed information. The horizontal scroll bar 46 includes a left arrow 54, a right arrow 56, and a horizontal bar 58. The horizontal scroll bar 46 provides the same function as the vertical scroll bar 44, but relative to information to the left and right of what is displayed in the window 42. The position of the horizontal bar 58 provides information relative to information logically located to the right and the left of the information displayed in the window 42.

Problems associated with the use of scroll bars include that they consume relatively large amounts of otherwise useful GUI real estate and that they are not aesthetically pleasing. Further, when the graphical user interface element which requires scrolling is relatively small, such as a context menu, the size of a scroll bar becomes a major obstacle.

Context menus are menus which provide selectable choices or options to a user in a stack of panes, with one choice being provided per pane. Context menus are relatively small, with typically only a word or two of text being provided in each pane. However, in some cases a context menu may contain may choices, such as when a context menu lists each method in a large class. The context menu may then be larger than desired by a developer, or even taller than the display space available. In such cases, some means for displaying only some of the choices at a time while permitting access to all choices is required.

A number of alternative or supplemental techniques have been provided for permitting access to data which is not displayed or enhancing the data provided to a user via a scroll bar. For example, co-pending U.S. patent application Ser. No. 08/298,704, entitled "Method and System for Indicating Boundaries of Connected Data Subsets", which was filed on Aug. 31, 1994 and is assigned to the common assignee as this invention, provides a new type of indicator for indicating to users the relative position of displayed data within a list, as well as the amount of undisplayed data. However, this technique also uses significant amounts of screen real estate.

Additionally, scroll bars are less than ideal tools for applications written in languages or being operated according to standards or on platforms that do not support what is known as pointer grab. In systems that support pointer grab, when a user depresses a mouse button when the mouse cursor is over a first window, the mouse cursor or pointer remains active relative to the first window even if it is moved over the boundaries of that window to a different graphical user interface element. With the standard scroll bar, one technique for scrolling involves grabbing the vertical or horizontal bar and pulling it one way or another to affect scrolling in the desired direction. However, as scroll bars are typically on the edge of a graphical element, if a user moves the mouse cursor slightly off the element which employs the scroll bar, the desired scrolling does not occur and, the user may effectively select the other element for processing, which would then require deselecting of the newly select element and reselecting of the initial element. The Java programming language is one example of a programming language that does not support pointer grab.

Accordingly, a need exists for a visual tool and indicator for providing end users with information regarding undisplayed information with which users may scroll through the undisplayed information and which consume a minimum of screen real estate.

SUMMARY OF THE INVENTION

An object of the present invention is to provide an intuitive technique for scrolling up and down in a context menu which keeps visual clutter to a minimum.

Another object is to provide a technique for scrolling which requires minimal display real estate space.

Yet another object of the present invention is to provide an intuitive scrolling technique for applications or platforms that do not support pointer grab.

Other objects and advantages of the present invention will be set forth in part in the description and the drawings which follow, and, in part, will be obvious from the description or may be learned by practice of the invention.

The present invention will now be described with reference to the following drawings, in which like reference numbers denote the same element throughout.

BRIEF DESCRIPTION OF THE DRAWINGS

FIG. 6 illustrates a context menu utilizing the scrolling technique in accordance with the present invention having top and bottom scrolling mechanisms; and FIG. 7 illustrates a context menu having a top scrolling mechanism only.

DESCRIPTION OF THE PREFERRED EMBODIMENT

Figure 1:
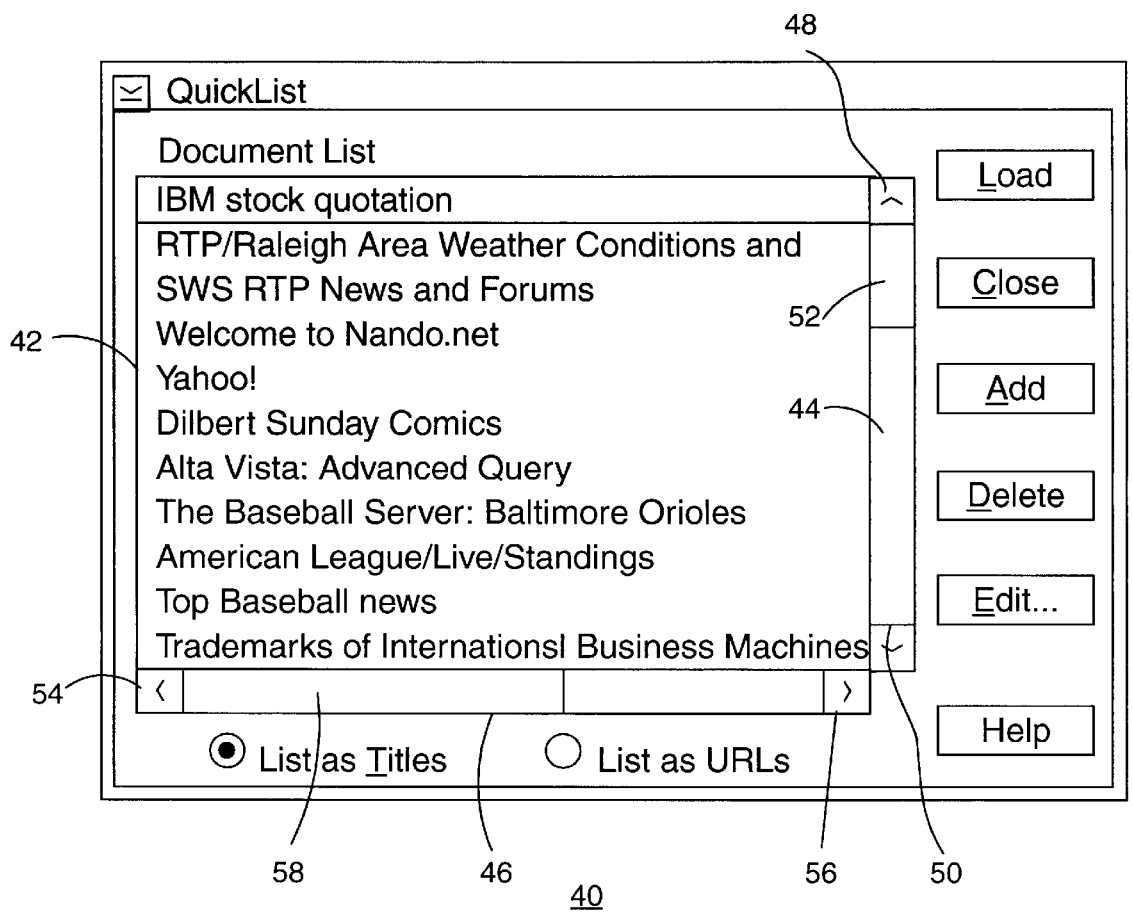
FIG. 1 illustrates a prior art scrolling system which utilizes scroll bars.
Figure 2:
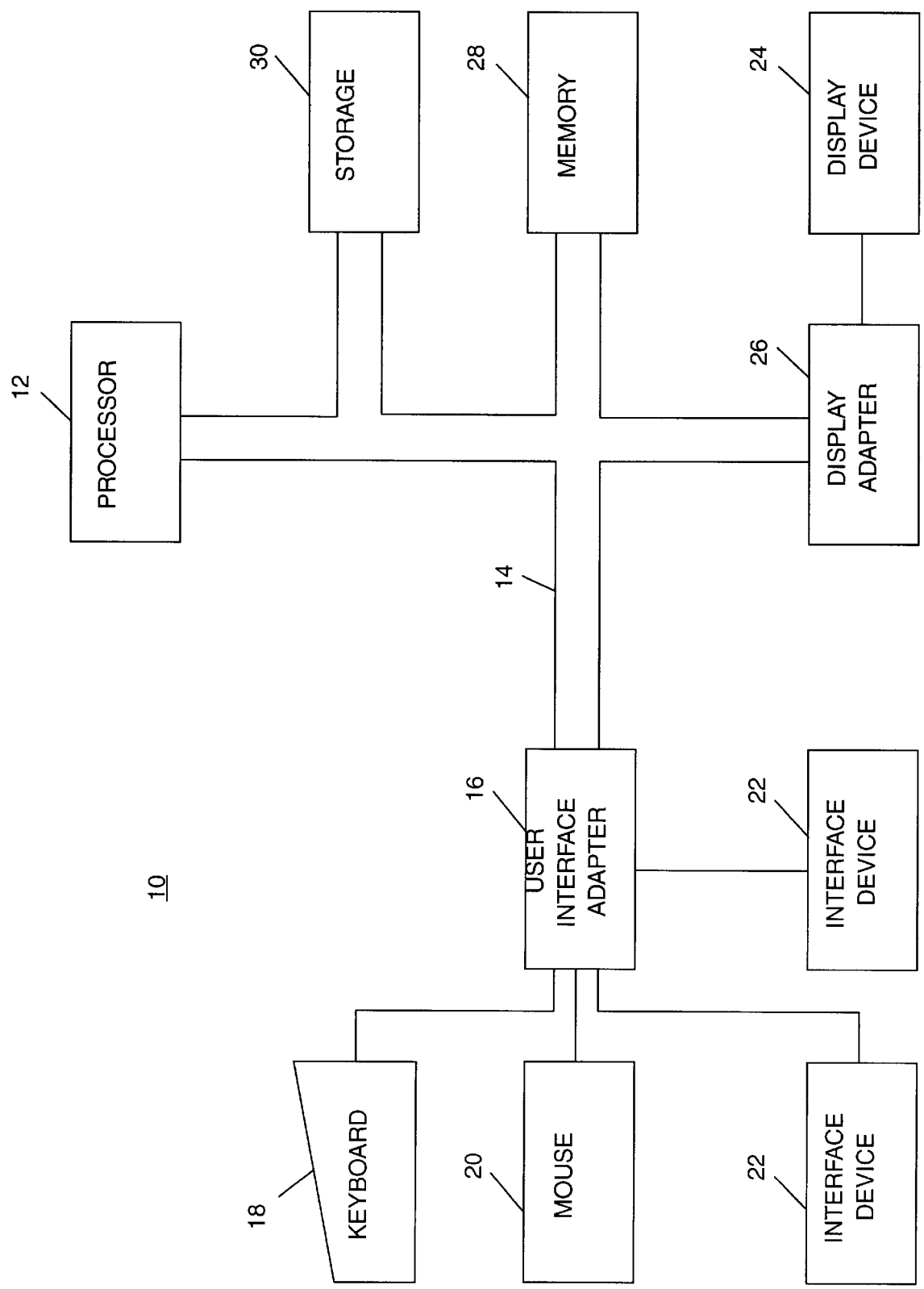
FIG. 2 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adaptor 26. The bus 14 also connects the microprocessor 12 to memory 28 and permanent storage 30 which can include a hard drive, tape drive, etc.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 7.

In the preferred embodiment, the present invention is implemented in the Java language. Object oriented languages, such as Java, Smalltalk and C++, typically include class libraries for use by developers when programming (developing applications) in the language. Class libraries are reusable sets of classes which typically provide relatively high level functionality. A class is one of the basic building blocks of object oriented languages, and comprises code which represents a combination of function and data. A developer creates an application by adding classes from a class library to the software application being created. A copy or instance of a class (an object) is included in the application being created.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All of these properties of object oriented programming, as well as related object orienting programming techniques, are well known to those skilled in the art, and will not be discussed in depth herein. While the present invention will be described in terms of a Java class which includes the scrolling technique, the present invention may be implemented utilizing other object oriented languages or even procedural languages such as C or COBOL.

Figure 3:
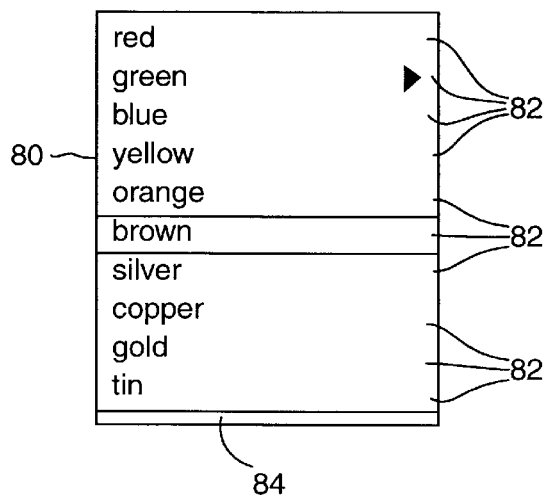
FIG. 3 illustrates a context menu utilizing the scrolling technique in accordance with the present invention.
Figure 3:
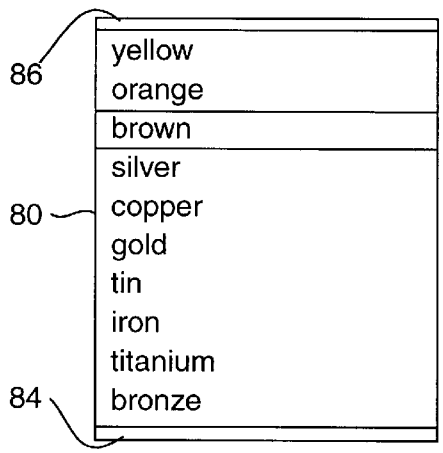
Figure 3:
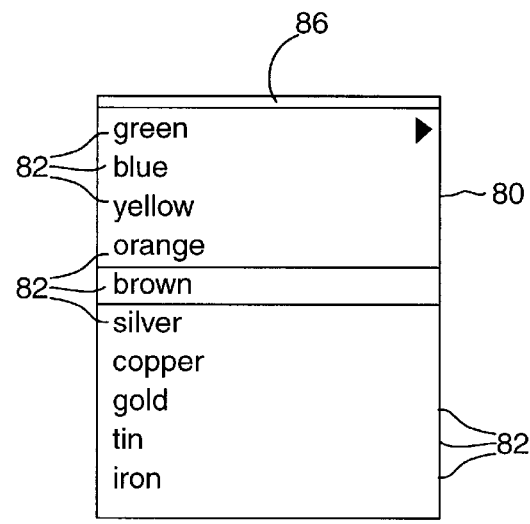

FIG. 3 illustrates a context menu 80 which utilizes the scrolling technique of the present invention. The context menu 80 displays ten pane slots 82 at a time, each of which includes a pane which is labeled with an option available to an end user of a software application. The panes in the slots 82 are typically not visually distinguished from each other, except when one of the panes is highlighted (which is an indication that the highlighted pane/option has been selected) and of course by the option label provided in each pane. The context menu 80 also includes a scroll mechanism 84 which is displayed in the form of a thin bar across the width of the bottom of the context menu 80. For purposes of this discussion, the context menu 80 logically includes thirteen panes, each of which provides a different user option and has a different option label. Thus, while only ten panes/options are displayed at any given time, the total number of options or choices available via the context menu is thirteen. In sequential order (from top to bottom), the choices are red, green, blue, yellow, orange, brown, silver, copper, gold, tin, iron, titanium and bronze. In the preferred embodiment, the context menu displays ten panes at a time, ten being the default pane display number. If a context menu contains fewer panes than the pane display number, scrolling is the deemed to be unnecessary, all of the panes/options are displayed at the same time in the context menu, and the scrolling technique according to the present invention will not be utilized relative to that context menu.

Figure 4:
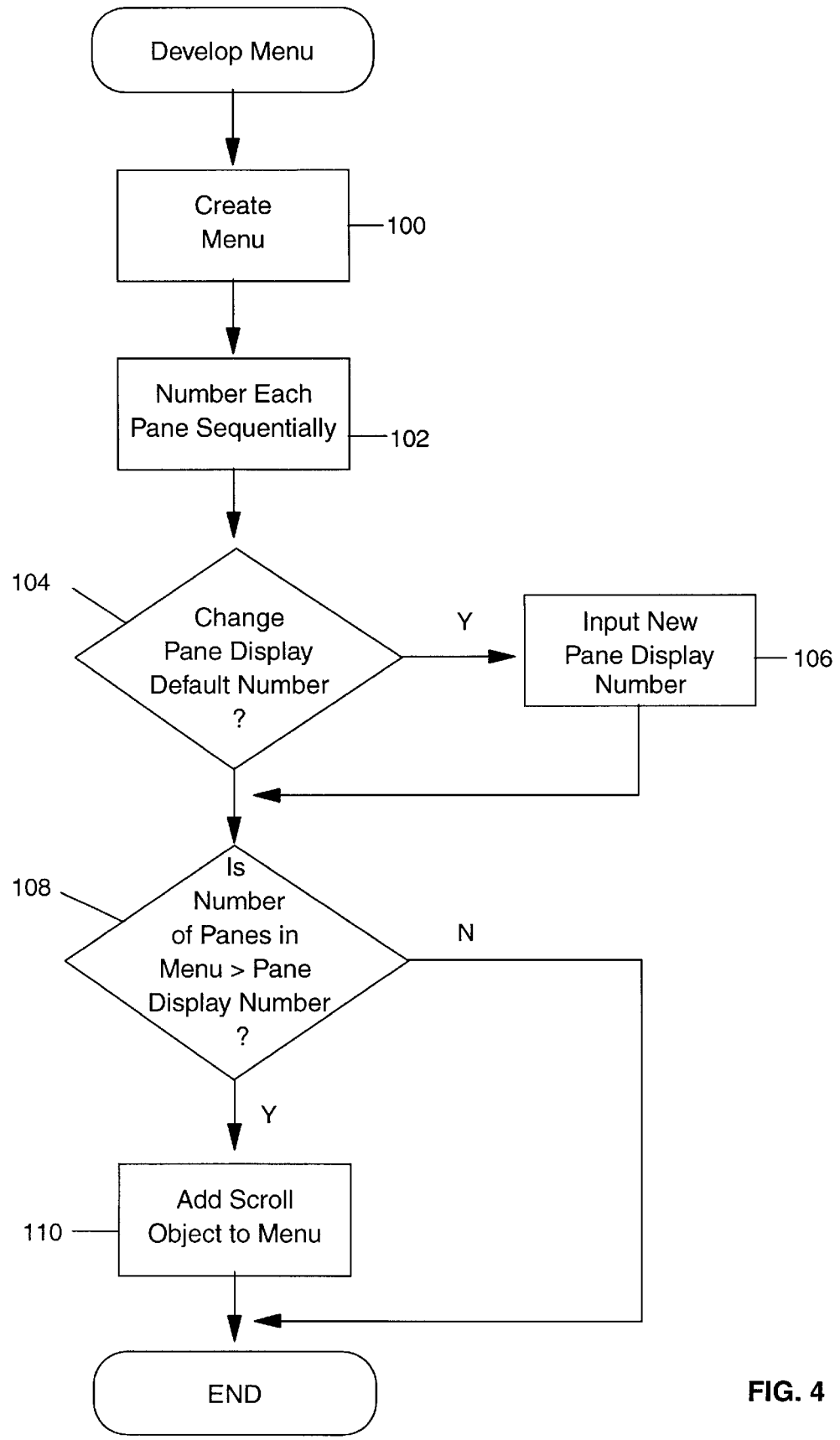
FIG. 4 shows a flowchart illustrating the logical steps associated with creating a context menu having the scrolling technique in accordance with the present invention.
Figure 5A:
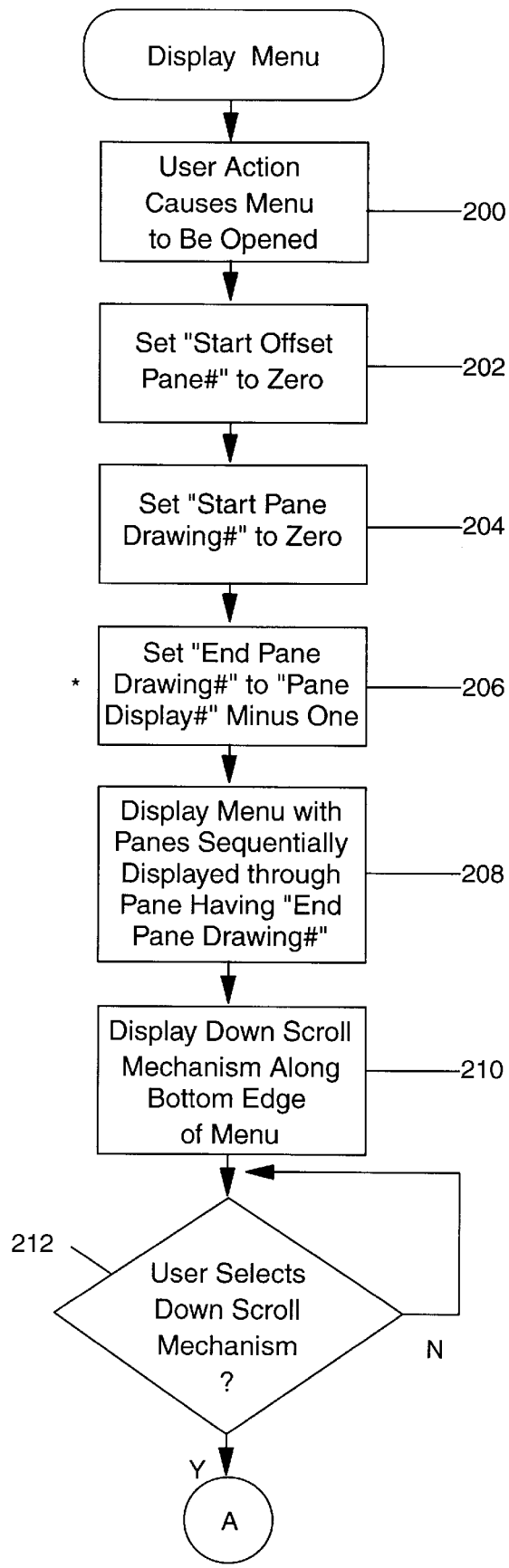
FIGS. 5A–5C show a flowchart illustrating the logical steps associated with manipulating a scrolling mechanism in a context menu which utilizes the scrolling technique in accordance with the present invention.
Figure 5B:
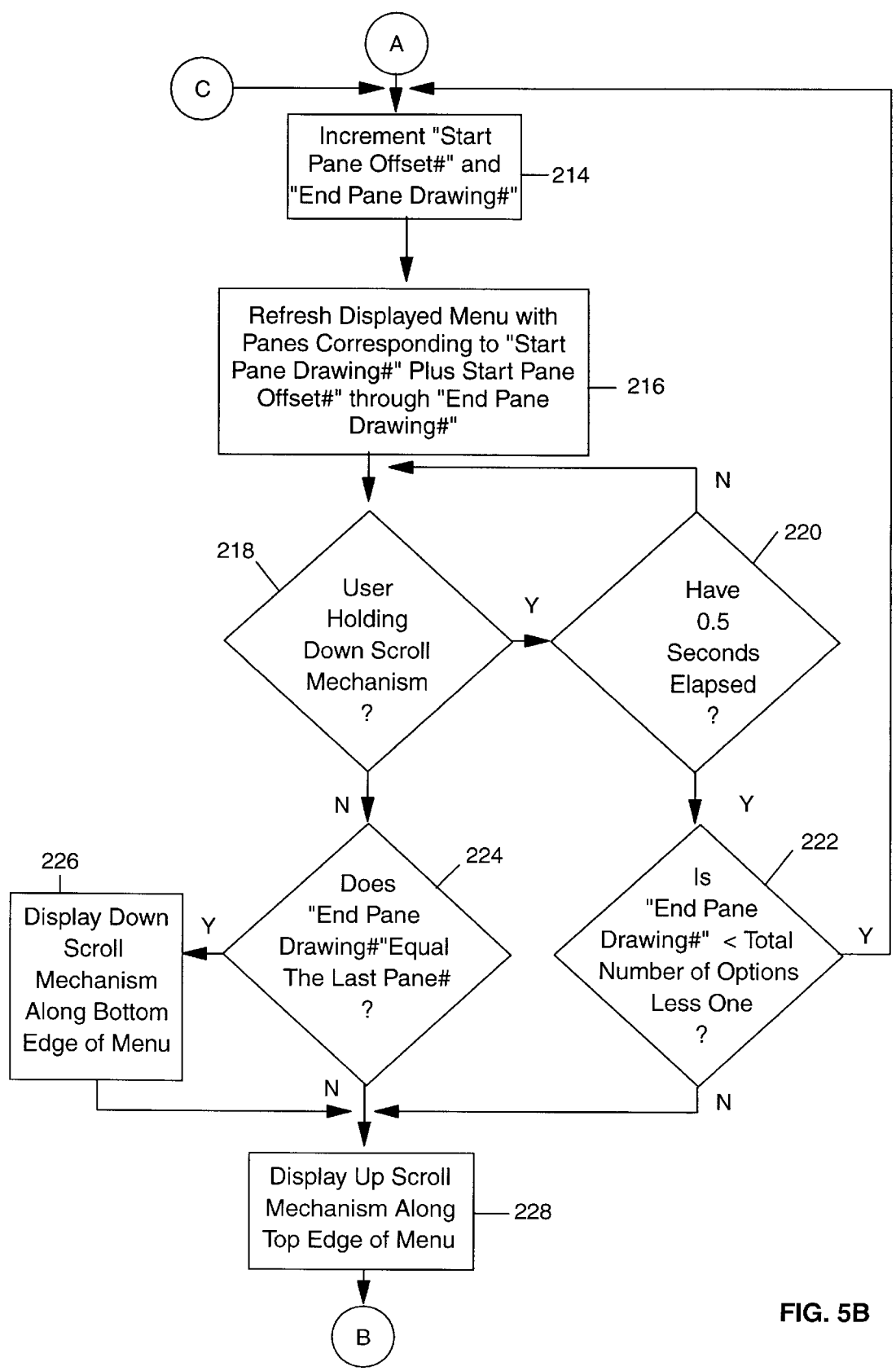
Figure 5C:
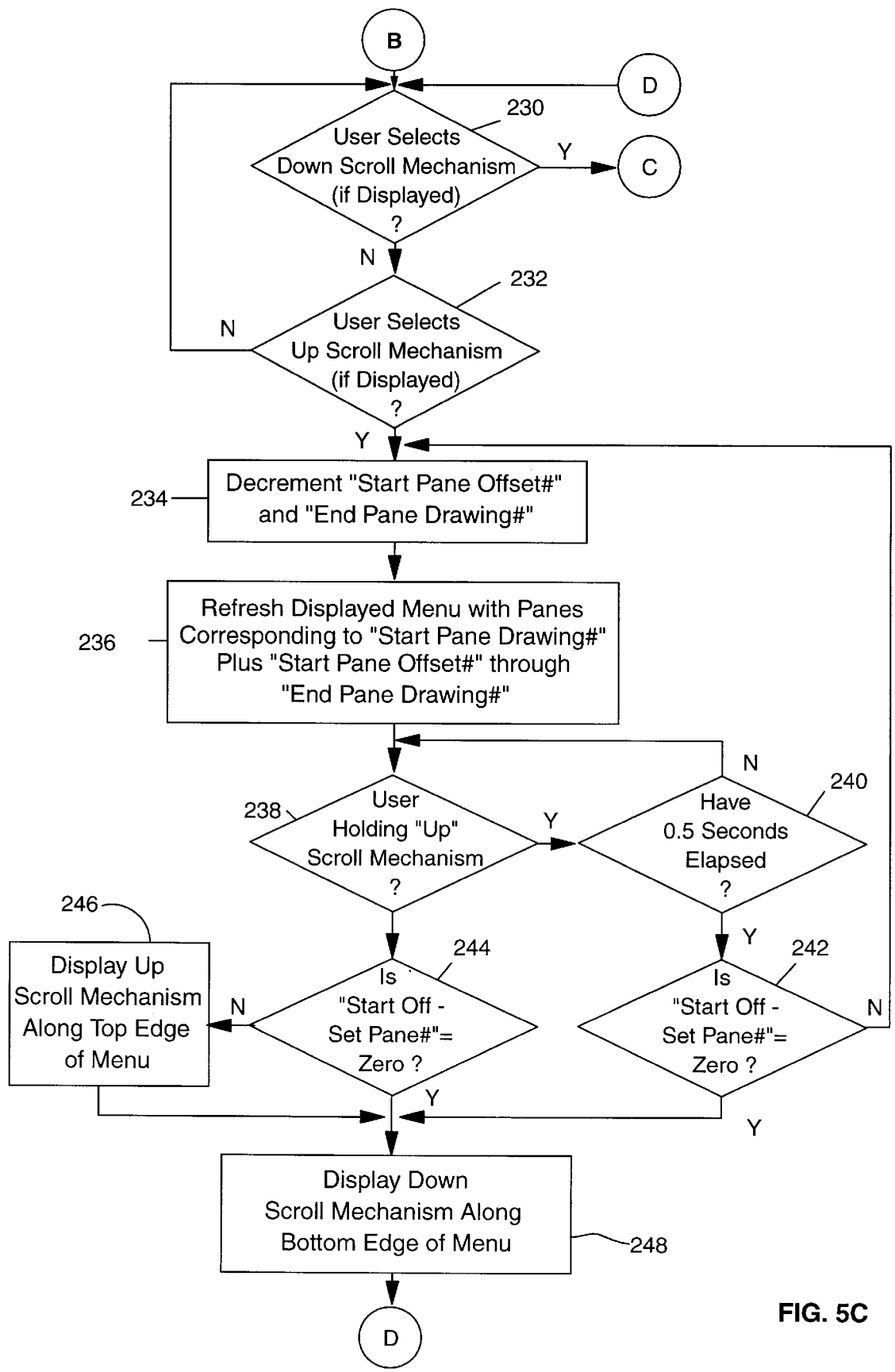

A technique for developing a context menu having the scrolling technique of the present invention will now be discussed with reference to the flowchart of FIG. 4. A developer of a software program application requiring a context menu first creates the context menu itself (without a scrolling function) in accordance with known techniques (Step 100). Context menus are presently created using a variety of known tools. An advanced technique for creating context menus is provided in copending U.S. patent application Ser. No. 08/709,937 entitled "Intuitive Technique for Building Graphical Menus" which was filed on Sep. 9, 1996, and is assigned to the same assignee as the present invention.

The tool provided in the copending patent application in its preferred embodiment is written in the Java programming language. In its preferred embodiment, the present invention is provided in the form of a Java class for use with a context menu building tool which is written in the Java programming language. In such an environment, usage of the present invention may be automatically considered by the tool, or may be invoked by the developer of the software application/context menu by specifying the Java scroll mechanism class which provides the function of the present invention. The Java class includes function which effectively takes control of the displaying of the context menu to a user during execution of the application, such that only a predetermined number of panes are displayed in conjunction with a scrolling mechanism.

If the scrolling technique of the present invention is applied to a context menu being created, each logical pane/option is numbered in sequence from top to bottom, beginning with zero (Step 102). Next, the developer may have option to change the default pane display number (Step 104). Preferably, the default pane display number is ten. However, depending upon the application, the developer may desire that more or fewer panes be displayed at a time in a given context menu. Accordingly, if the developer indicates in Step 104 that the developer desires to change the pane display number, the developer is prompted by the scroll mechanism class to input a new pane display number via a pop-up window or the like. Upon the developer inputting an acceptable pane display number, the pane display number is changed to the input number (Step 106).

Whether or not the developer decides to change the pane display number in Steps 104 and 106, processing proceeds to Step 108, in which it is determined whether or not the number of panes in the menu being created is greater than the pane display number. If the number of panes is not greater than the pane display number, the context menu being developed has no need for scrolling. Accordingly, processing relative to the scrolling mechanism would then terminate. However, if the number of panes in the context menu exceeds the pane display number, then a technique is necessary to change which panes are displayed, and scrolling will be implemented. An instance of the scroll mechanism class (a scroll mechanism object) is then added to the menu being developed (Step 110). By adding the scroll mechanism object to the menu only if it is determined in Step 108 that scrolling is actually required based on the number of panes in the menu, the addition of code which would not otherwise be used is prevented, thus keeping the amount of menu code and thus the size of the overall application in which the menu is included smaller. This reduces system requirements and helps enhance performance of applications.

The function provided by the present invention by the scrolling mechanism object will now be discussed relative to the actual use of a context menu which includes and utilizes the scrolling mechanism object. Now referring to the flowchart of FIG. 5, during execution of an application having a context menu including the scrolling technique according to the present invention, a user, by selecting an appropriate option within the application, causes the context menu to be opened (Step 200). In preparing the context menu for display, a "start offset pane number" variable is first set to zero (Step 202), as is a "start pane drawing number" variable (Step 204). Further, an "end pane drawing number" is set to the pane display number minus one (Step 206). One is subtracted from the pane display number because when the panes in the context menu were initially numbered, they were numbered sequentially beginning with zero. The context menu is then displayed on a display device. The panes are displayed sequentially from top to bottom, beginning with the pane having the start pane drawing number as the first pane in the top pane slot 82 of the context menu 80 and ending with pane having the end pane drawing number in the bottom pane slot 82 of the context menu (Step 208). This is illustrated in FIG. 3, in which panes/options 0–9 are displayed in the context menu 80. Next, a "down" scroll mechanism 84 is displayed along the bottom edge of the context menu 80 (Step 210).

The down scroll mechanism 84 along the bottom edge of the menu 80 indicates to the user that additional panes/options are available but are not displayed, and that these options logically exist in panes located beneath the bottom-most pane slot 82 in the context menu 80. As with any context menu, a user selects one of the choices by selecting the pane in which the choice is displayed. In accordance with the present invention, the user may also select the down scroll mechanism 84 (Step 212). Note that no "up" scroll mechanism is currently displayed, as no panes/choices may logically exist at this time above the pane/choice displayed in the top-most pane slot 82 of the menu 80.

When the user selects the down scroll mechanism 84, the "start pane off set number" and the "end pane drawing" are incremented by one (Step 214). Then, the displayed menu 80 is refreshed with the panes corresponding to the "start pane drawing number" plus "the start pane offset number" sequentially through the "end pane drawing number" (Step 216). The first time the down scroll mechanism 84 is selected following the initial display of the context menu 80, the display of panes/options 0–9 in the pane slots 82 is replaced with the display of panes 1–10. Typically, a user selects the down scroll mechanism 84 by placing the mouse cursor over the down scroll mechanism 84 and clicking an appropriate mouse button. Other known selection techniques are also available. However, the user may cause continued scrolling down to display lower options/panes by holding the down scroll mechanism 84 such as by holding down the mouse button. If it is determined in Step 218 that the user is holding the mouse button down, it is then determined in Step 220 whether or not the user has held down the mouse button for more than predetermined period of time. For example, the predetermined period of time may be set to 0.5 seconds. Such a period of time prevents accidental continued scrolling, as the user must affirmatively keep the down scroll mechanism 84 selected via a mouse button. Thus, when the user initially selects the down scroll mechanism 84, a clock associated with the workstation 10 starts to count the elapsed time, and the counting of elapsed time does not end until the down scroll mechanism 84 is released by the user. The amount of time the down scroll mechanism 84 has been held is checked regularly, and when it is determined in Step 220 that the elapsed time exceeds the predetermined amount of time, processing proceeds to Step 222, in which it is determined whether the last sequential option/pane is being displayed as the bottom-most pane slot 82 in the displayed context menu 80. If the last sequential pane is not being displayed in the bottom-most pane slot 82 in the context menu 80, processing returns to Step 214 so that the menu 80 can scroll down one additional option/pane. In the present example, this would result in options/panes 1–10 being replaced with options/panes 2–11. Scrolling down will occur for each 0.5 second increment which elapses as determined in Step 220 during which the down scroll mechanism 84 is held until it is determined in Step 222 that the last sequential option/pane is being displayed in the bottom-most pane slot 82 in the menu 80. Otherwise, when it is determined in Step 218 that the user has stopped holding the down scroll mechanism 84, the scrolling down ceases.

When it is determined in Step 218 that the user has stopped holding the down scroll mechanism 84, processing proceeds to Step 224, in which it is determined whether or not the option/pane being displayed in the bottom-most pane slot 82 in the context menu 80 is the last sequential option/pane which logically exists relative to the menu 80. If not, the down scroll mechanism 84 will continue to be displayed along the bottom edge of the context menu 80 (Step 226). If so, no down scroll mechanism is displayed along the bottom edge of the menu 80, as no options/panes logically exist beneath the option/pane which is displayed in the bottom-most pane slot 82, and processing proceeds directly to Step 228. In either case, as options/panes must now logically exist above the option/pane now displayed in top-most pane slot 82 in the context menu 80, an "up" scroll mechanism 86 (FIG. 6) is displayed along the top edge of the context menu 80 (Step 228). Similarly, if it is determined in Step 222 that no further scrolling is possible in response to a user holding the down scrolling mechanism 84, a down scroll mechanism will not be displayed in the refreshed menu, and processing proceeds to Step 228 to cause the up scroll mechanism 86 to be displayed along the top edge of the menu 80. Following Step 228, refreshing of the menu in response to selection of the down scroll mechanism 84 ends, and the context menu 80 is now ready for further scrolling by a user, as will now be described.

Now referring to FIG. 6, if the down scroll mechanism 84 remains displayed (indicating that choices logically exist below the bottom-most pane) and the user selects the down scroll mechanism 84 (Step 230), processing returns to Step 214 in order to scroll the menu 80 down. FIG. 7 illustrates the case in which no panes/options logically exist below the bottom-most pane slot 82 in the context menu 80, and thus no down scroll mechanism is displayed. If the user selects the up scroll mechanism 86 (which is displayed if the top most pane displayed in the menu 80 is not the first sequential pane), processing proceeds to Step 234. In Step 234, the "start pane offset number" and the "end pane drawing number" are decremented. Next, the displayed menu 80 is refreshed with panes/options corresponding to the start pane drawing number plus the now decremented start pane offset number through the decremented end pane drawing number (Step 236). In this way, if panes 2–11 have previously been displayed, in the context menu 80, the context menu 80 will be refreshed to display panes 1–10 in the pane slots 82. A determination is then made as to whether or not the user is holding the up scroll mechanism 86. If it is determined in Step 238 that the user is indeed holding the up scroll mechanism 86 and in Step 240 that the predetermined period of time has elapsed, it is then determined in Step 242 whether or not the top most displayed pane slot 82 is displaying the first sequential pane in the menu by determining if the "start offset pane number" is equal to zero. If it is not, the first sequential pane is not being displayed in the top most pane slot 82, and processing returns to Step 234 in order to scroll up the menu. This process is repeated every 0.5 seconds until the user releases the up scroll mechanism or until the first sequential pane is determined to be displayed in the top-most pane slot 82 in the context menu 80 in Step 242.

If it is determined in Step 238 that the user released the up scroll mechanism 86 prior to it being determined in Step 242 that the first sequential pane is displayed in the top-most pane slot 82 in the context menu 80, processing proceeds to Step 244, where a determination is made as to whether or not the first sequential pane is displayed as the top most pane in the context window 80 by determining whether the start offset panel number is equal to zero. If it is not equal to zero, then the refreshed menu will include the up scroll mechanism 86 in its display along the top edge of the menu (Step 246), as panes logically exist above the top-most displayed pane. After displaying the up scroll mechanism in Step 246, the logic causes the down scroll mechanism 84 to be displayed along the bottom edge of the context menu 80 (Step 248), as after scrolling the menu up, panes must logically exists beneath the bottom-most displayed pane in the context menu 80. Further, if it is determined that the top-most displayed pane is the first sequential logical pane in either Step 242 or 244, the up display mechanism will not be displayed in the context menu 80, and processing proceeds to Step 248 to display the down scroll mechanism 84 along the bottom edge of the menu 80. Processing then returns to Step 230 to await user selection of either the down scroll mechanism 84 (if displayed) or the up scroll mechanism 86 (if displayed).

Alternatively, a simpler embodiment of the present invention may be provided, such that up and down scroll mechanisms are always displayed within the context menu 80. However, if no panes logically exist above the top-most displayed pane of the menu, nothing would happen when the user selects the up scroll mechanism. Code in the Java class could cause a beep or tone to be sounded to indicate to the user that no scrolling up is possible. A beep could also be coded to sound upon selection of the down scroll mechanism if no panes logically exist beneath the bottom-most pane displayed in the context menu.

Alternatively, only a single scroll mechanism along either the top edge or the bottom edge of the context menu 80 could be utilized for scrolling both up and down. Selecting the right portion of such a scroll mechanism causes the menu to scroll down in accordance with the logic discussed herein, while selecting the left portion of the bar causes the menu to scroll up in accordance with the logic discussed herein for scrolling down. The right and left sides of the single scrolling mechanism can be visually distinguished from each other by means such as color or a vertical line dividing the mechanism in half. Alternatively, two identical mechanisms can be displayed side by side, with the left mechanism for scrolling up and the right mechanism for scrolling down. Further, a visual indication could be added in the form of color, such that, for example, a mechanism could be colored red when no new scrolling is possible in the direction which selection of the mechanism would ordinarily cause scrolling to occur.

The present invention may also be applicable to other types of elements displayed in a graphical user interface. For example, windows often use vertical and horizontal scroll bars to indicate that information logically exists above and/or below and to the right and/or the left of what is being displayed to a user at a given time. For such other graphical elements, since the graphical elements are not typically divided up in terms of panes, the algorithms discussed herein would have to be modified or new corresponding algorithms would need to be developed in order to implement scrolling utilizing up, down, right or left scrolling mechanisms which could be placed at the corresponding edges of a graphical element.

While the present invention has been described in terms of a Java class for providing scrolling, the basic techniques described herein may be implemented in many different programming languages. Thus, while the preferred embodiment of the present invention has been described, additional variations and modifications in that embodiment may occur to those skilled in the art once they learn of the basic inventive concepts. Therefore, it is intended that the appended claim shall be construed to include both the preferred embodiment and all such variations and such modifications as fall within the spirit and scope of the invention.

I claim:

1. Computer readable code embodied on a computer readable-medium for use in a computing environment for providing a scrolling function for a context menu which logically comprises a first number of panes and for which a second number of panes may be displayed at a time via a graphical user interface, and the first number of panes is larger than the second number of panes, comprising:

first subprocesses for displaying a predetermined number of panes in a context menu;

second subprocesses for determining whether the predetermined number of panes is less than a total number of panes logically associated with the context menu;

third subprocesses for displaying a selectable mechanism along a bottom edge of the context menu if it is determined that the total number of panes is greater than the predetermined number of panes, wherein the selectable mechanism is a bar having a width substantially equal to that of the context menu; and fourth subprocesses for causing the panes displayed in the context menu to logically scroll down one pane upon selection of the mechanism by a user.

2. Computer readable code according to claim 1, wherein the context menu as displayed comprises a number of horizontally disposed vertically stacked slots, one pane is displayed in each of the slots, and the number of slots is equal to the predetermined number of panes, wherein the panes are numbered sequentially from a first pane to a last pane, and wherein the context menu is first displayed when opened with the panes sequentially displayed in the slots from top to bottom of the context menu starting with the first pane in a top-most slot.

3. Computer readable code according to claim 2, further comprising fifth subprocesses for monitoring changes in the context menu as displayed and causing a top selectable mechanism to be displayed along a top edge of the context menu when undisplayed panes logically exist above the pane displayed in the top-most slot of the context menu; wherein selection of the top selectable mechanism by the user causes the panes to logically scroll up.

4. Computer readable code according to claim 1, further comprising:

sixth subprocesses for causing the selectable mechanism along the bottom edge of the context menu not to be displayed when no panes logically exist beneath the pane is displayed beneath a bottom-most displayed pane of the context menu.

5. Computer readable code according to claim 1, wherein each of the panes include an available option and the panes are sequentially ordered and displayed in a vertically stacked manner in the context menu from a top-most pane through a bottom-most pane.

6. In a computing environment, a system for providing scrolling of panes within a context menu which does not display all of its panes at a time, comprising:

first means for determining whether a total number of panes logically associated with a context menu exceeds a number of display slots to be displayed for the context menu;

second means for displaying the context menu;

third means for displaying a selectable mechanism along a bottom edge of the context menu if it is determined by said first means that the total number of panes exceeds the number of display slots, wherein the selectable mechanism is a bar having a width substantially equal to that of the context menu; and fourth means for scrolling the panes through the display slots of the context menu upon user selection of the selectable mechanism, the panes displayed in the context menu logically being scrolled down one pane upon the user selection.

7. A system according to claim 6, wherein the context menu as displayed comprises a number of horizontally disposed vertically stacked display slots, and one pane is displayed in each of the display slots;

wherein the panes are numbered sequentially from a first pane to a last pane, and wherein the context menu is first displayed when opened with the panes sequentially displayed in the slots from top to bottom of the context menu starting with the first pane in a top-most slot.

8. A system according to claim 6, further comprising:

fifth means for causing the selectable mechanism along the bottom edge of the context menu not to be displayed when no panes logically exist beneath the pane which is displayed beneath a bottom-most display slot of the context menu.

9. A system according to claim 6, wherein each of the panes includes an available option, and the panes are sequentially ordered and displayed in a vertically stacked manner in the context menu from a top-most pane through a bottom-most pane.

10. A method for scrolling panes within a context menu which does not display all of its panes at a time, comprising the steps of:

(a) determining whether a total number of panes logically associated with a context menu exceeds a number of display slots to be displayed for the context menu;

(b) displaying the context menu;

(c) displaying a selectable mechanism along a bottom edge of the context menu if it is determined by said step (a) that the total number of panes exceeds the number of display slots, wherein the selectable mechanism is a bar having a width substantially equal to that of the context menu; and (d) scrolling the panes through the display slots of the context menu upon user selection of the selectable mechanism, the panes displayed in the context menu logically being scrolled down one pane upon the user selection.

11. A method according to claim 10, wherein the context menu as displayed comprises a number of horizontally disposed vertically stacked display slots, and one pane is displayed in each of the display slots;

wherein the panes are numbered sequentially from a first pane to a last pane, and wherein the context menu is first displayed when opened with the panes sequentially displayed in the slots from top to bottom of the context menu starting with the first pane in a top-most slot.

12. A method according to claim 11, further comprising the step of (e) monitoring changes in the context menu as displayed and causing a top selectable mechanism to be displayed along a top edge of the context menu when undisplayed panes logically exist above the pane displayed in the top-most slot of the context menu; wherein selection of the top selectable mechanism by the user causes the panes to logically scroll up.

13. A method according to claim 10, further comprising the step of (f) causing the selectable mechanism along the bottom edge of the context menu not to be displayed when no panes logically exist beneath the pane is displayed beneath a bottom-most displayed pane of the context menu.

* * * * *